United States Patent Office 3,459,521
Patented Aug. 5, 1969

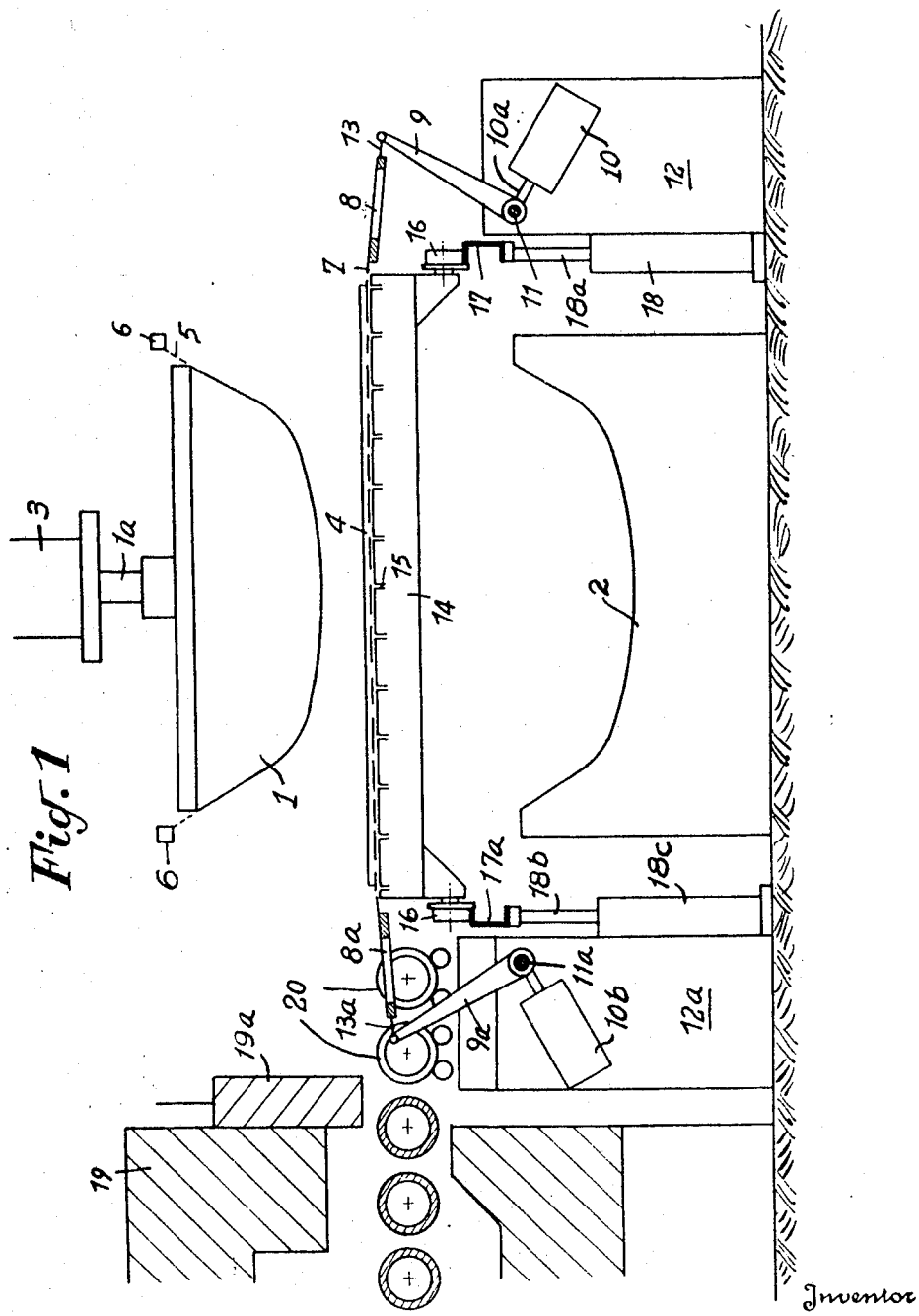

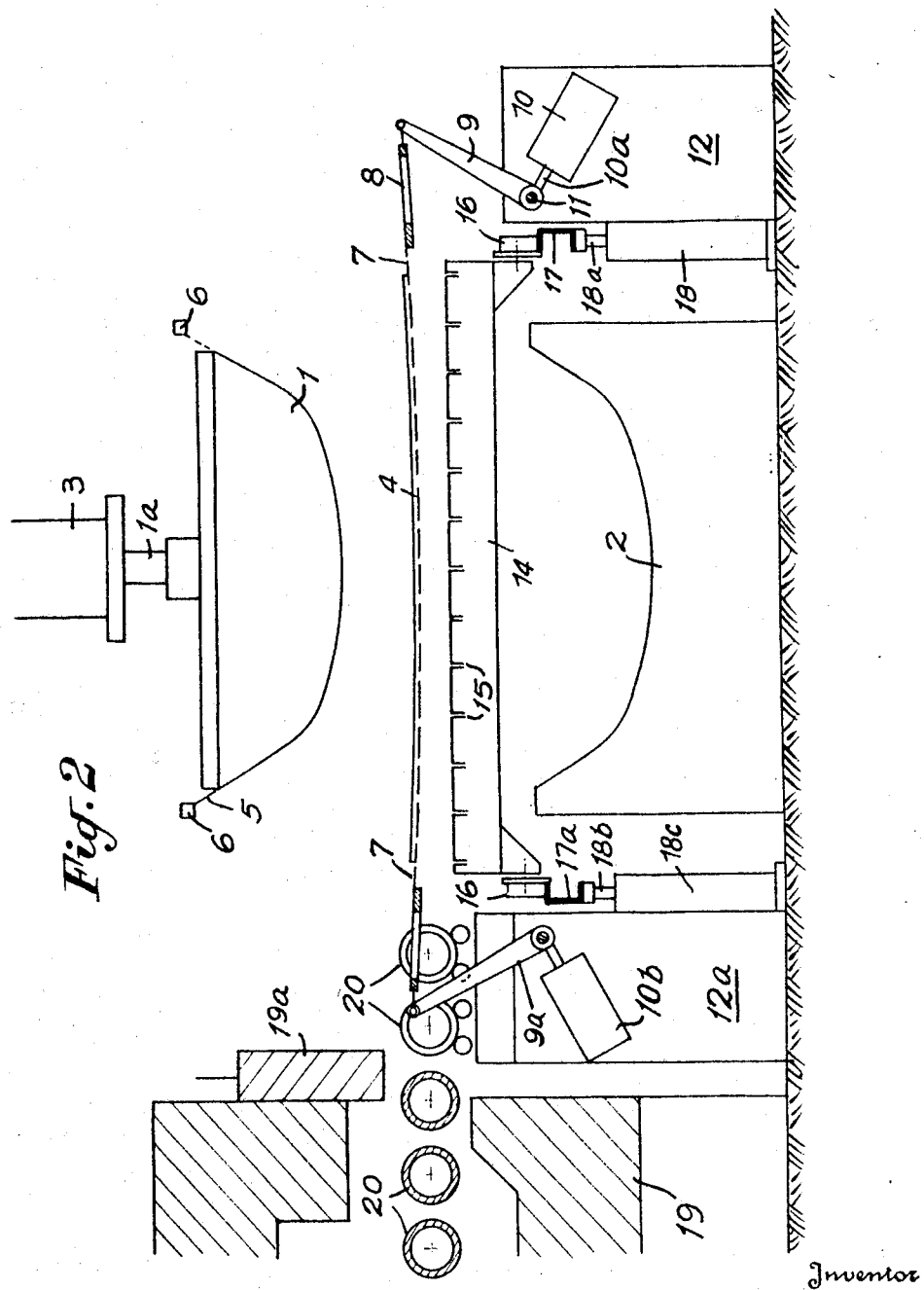

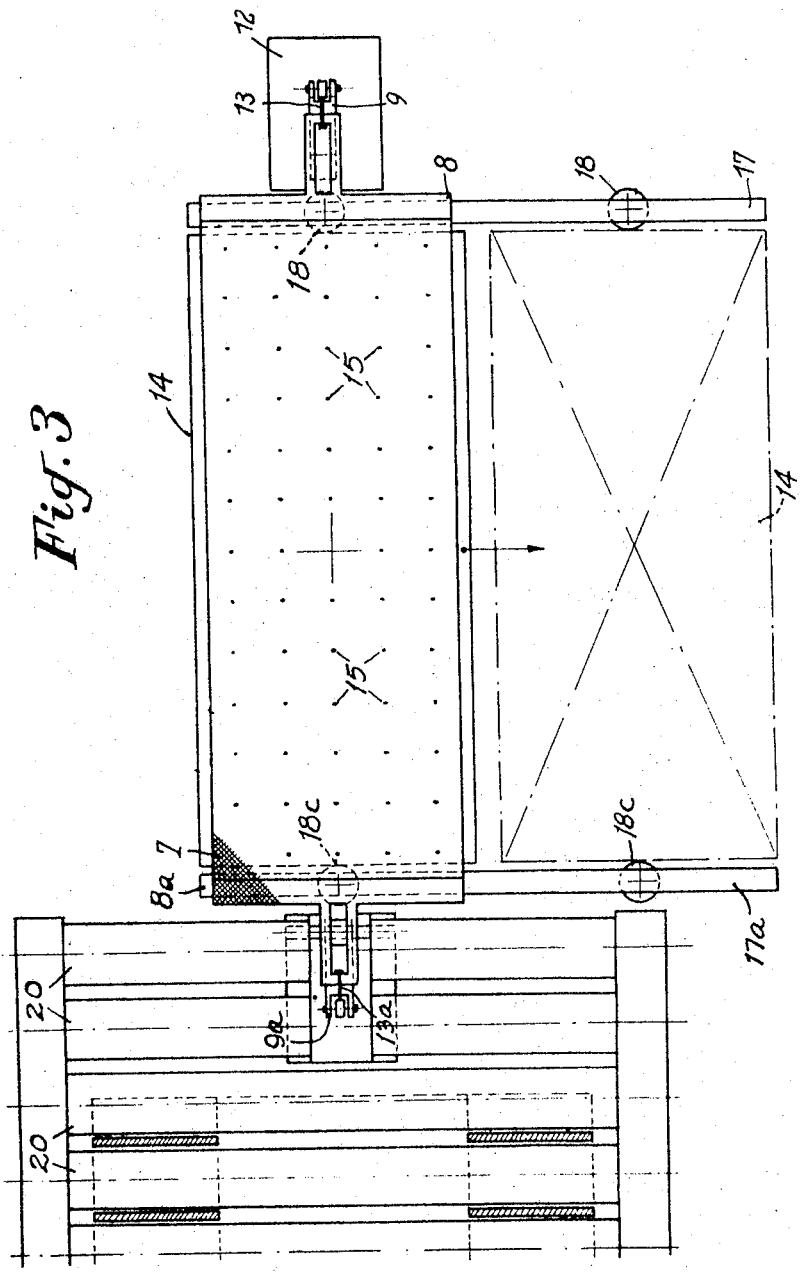

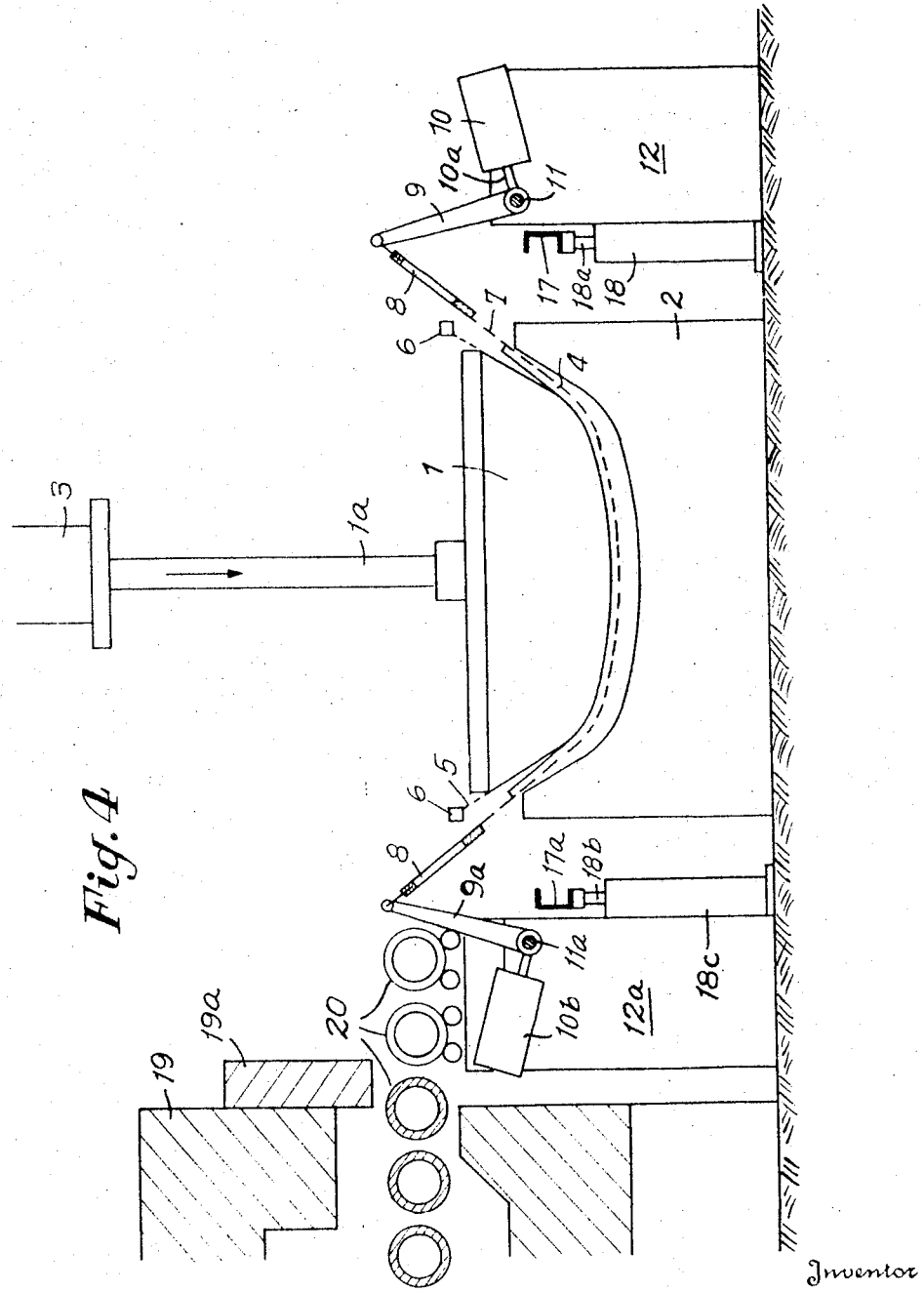

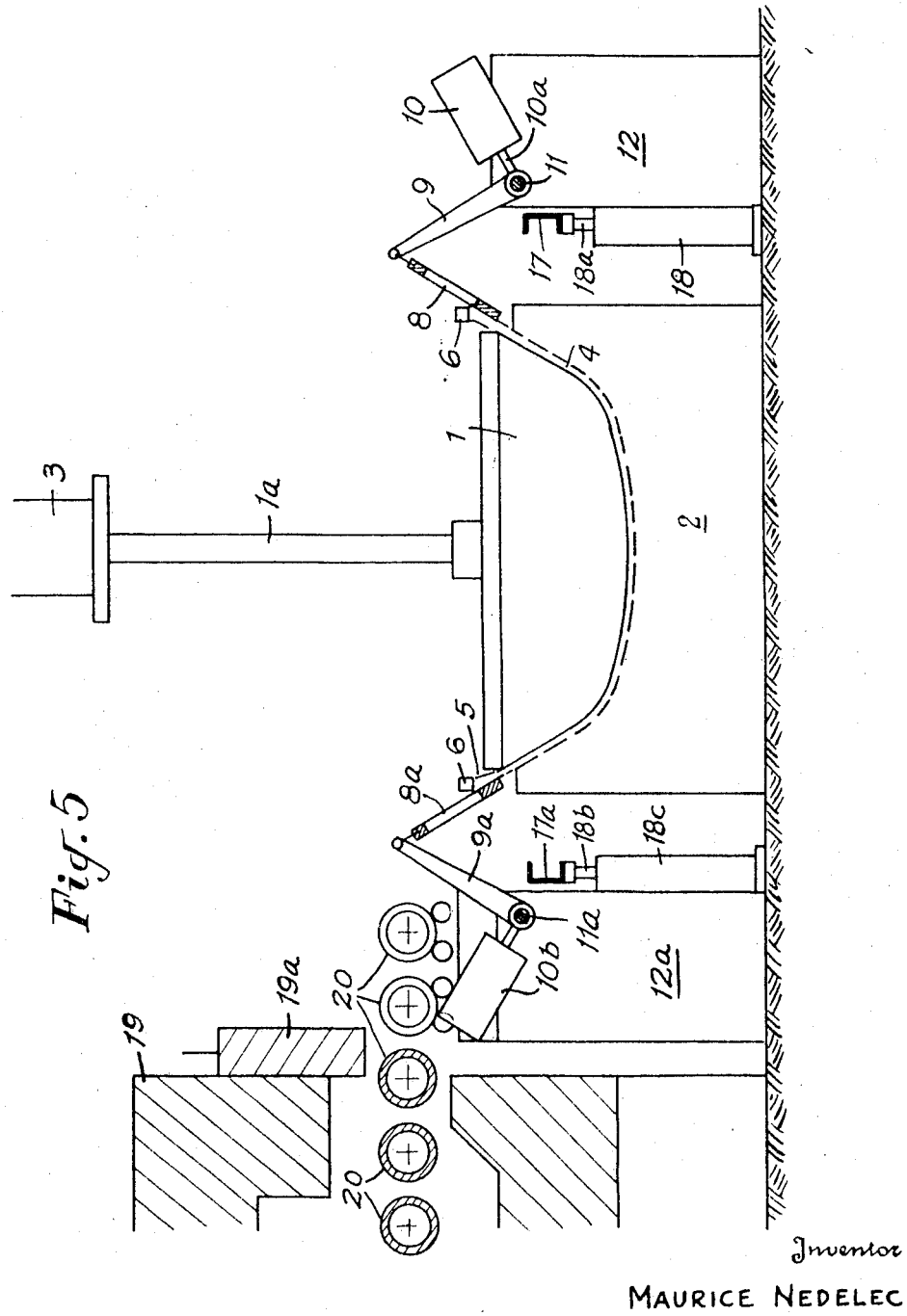

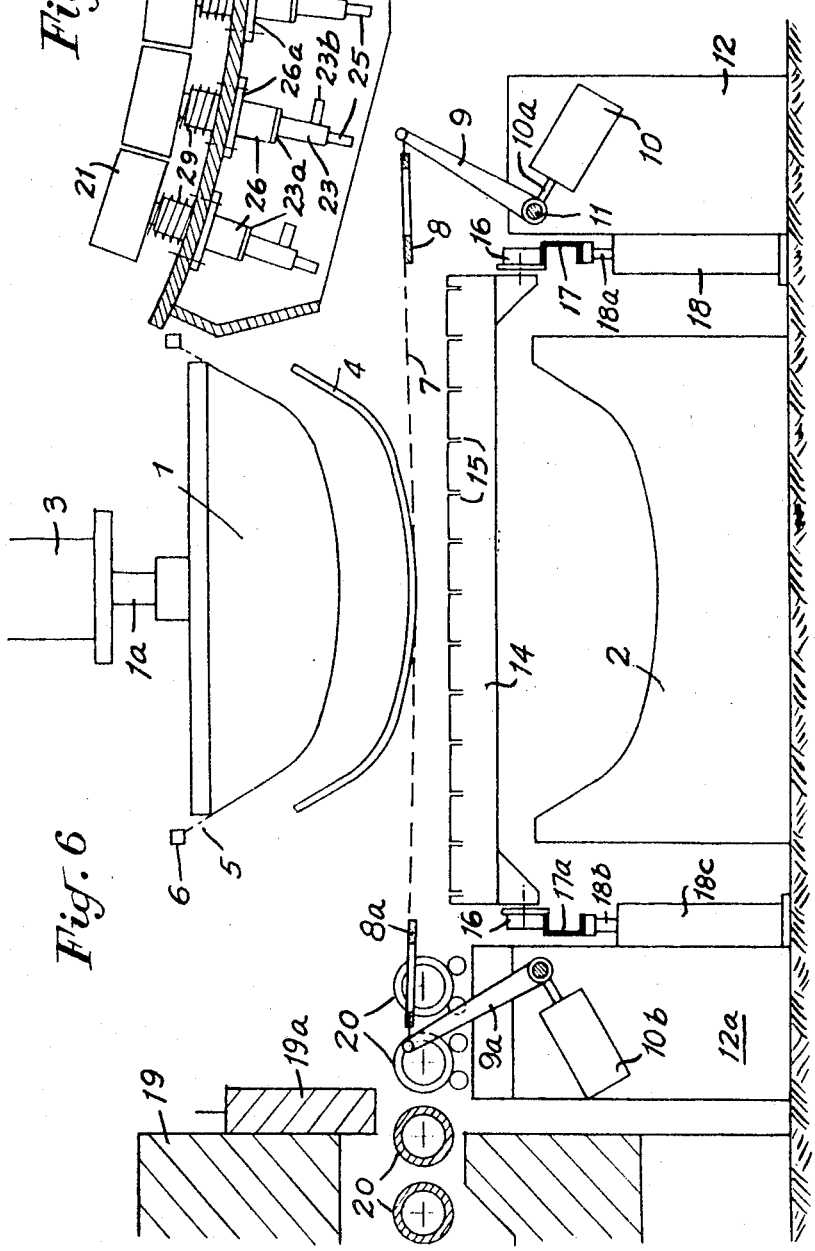

3,459,521
METHOD OF AND APPARATUS FOR THE
SHAPING OF PLASTIC SHEETS
Maurice Nedelec, Paris, France, assignor to Compagnie de Saint-Gobain, Neuilly-sur-Seine, France
Filed Mar. 29, 1965, Ser. No. 443,384
Claims priority, application France, Apr. 2, 1964, 969,526, Patent 1,398,897, Apr. 5, 1965
Int. Cl. C03b 39/00
U.S. Cl. 65—25                8 Claims

ABSTRACT OF THE DISCLOSURE

Method and apparatus for shaping a sheet of glass. The hot glass sheet is positioned over a platen provided with orifices over its area and through which cushioning air is forced to support the sheet over the platen and a hammock of foraminous fabric is interposed between the platen and the hot glass sheet. After emplacement of the sheet over the platen, the air is cut off and the platen is lowered away from the hammock leaving the sheet supported by the hammock between upper and lower shaping dies. The dies are forced together with the sheet and hammock between them to shape the sheet.

---

This invention relates to a method of and an apparatus for the pressing and shaping of sheets of plastic material, especially sheets of glass. More particularly the invention relates to a method of and apparatus for the formation by pressing, of a sheet of material such as glass of generally flat planar form, into a form curved in at least one plane.

It is the chief purpose and object to provide a method of and apparatus by which sheets of material such as glass may be shaped into predetermined forms curved in one or a plurality or angularly-related planes.

Another object is to provide a method and apparatus as aforesaid which are readily and facilely adaptable to complete automation.

Another object is to provide a method and apparatus by which a sheet of glass in flat or planar form may be drawn directly from a heating furnace or oven while supported on a cushion of gas, such as air, transferred while so supported to a position between shaping dies, pressed into desired form between the dies, cooled, tempered and rigidified while under pressure, and transferred to a location for final processing, packaging or installation.

Yet another object is to provide a method of and apparatus for the pressing into preselected form, of sheets of glass, in a relatively rapid and more expedient way than is possible with prior art methods and apparatus.

Still another object is to provide means by which a sheet of material heated to plasticity is drawn from a heating or tempering furnace, supported on a cushion of gas and, while so supported, translated horizontally in its own plane to and between relatively vertically movable, complementary-shaped dies for pressing and shaping therebetween.

Another object is to provide an apparatus as aforesaid including a hammock of flexible, foraminous material to support the glass sheet horizontally between the dies and means yieldably stretching the hammock horizontally between the dies.

Yet another object is to provide an apparatus by which the sheet may be tempered by contact with the surfaces of the dies which are hollow and internally cooled by circulation of a cooling fluid. The sheet may also be variably tempered over selected areas thereof while being pressed.

Other objects and advantages of the invention will become clear to those skilled in the art after a study of the following detailed description in connection with the accompanying drawing.

In the drawing:

FIGURE 1 is an elevational view of the apparatus for carrying out the method and showing the parts just after a sheet of glass has been transferred from the heating oven into position between the upper and lower dies and before the supporting platen has been horizontally translated free of the sheet;

FIGURE 2 is a view corresponding to FIGURE 1 but showing the foraminous platen or support lowered free of the sheet and ready for horizontal translation from between the dies, leaving the sheet supported solely by the flexible hammock;

FIGURE 3 is a plan view of the apparatus of FIGURES 1 and 2, showing the parts in the positions of FIGURE 2 and indicating by dot-dash lines the position of the platen after it has been moved horizontally from between the dies, the hammock being largely omitted to avoid obscuration of the platen below;

FIGURE 4 is a view corresponding to FIGURES 1 and 2, showing the upper die lowered to nearly final position to impart the desired shape to the sheet;

FIGURE 5 is a view corresponding to FIGURE 4 showing the upper die fully pressed into interfitting relation with the lower die to complete the shaping of the sheet of glass and to temper the same;

FIGURE 6 shows the upper die retracted, the shaped sheet supported solely by the hammock ready for removal, and the platen horizontally moved to its initial position between dies but before it has been elevated to the position of FIGURE 1 ready to receive or support the next sheet; and FIGURE 7 is a detail broken view to an enlarged scale, partly in section, of an alternative form of lower die having its shaping surface formed of a plurality of movably-mounted sections.

The fabrication of rolled sheet glass is essentially one in which the sheet is in flat or horizontal position. Consequently, it is preferable that subsequent operations upon the sheets should be carried out while the sheet remains horizontal. Such a mode of operation facilitates automation of shaping in a continuous sequence, and enables more rapid processing and an increase in the number of cycles or sheets shaped per unit of time. Furthermore, processing of the sheets in horizontal position eliminates the marks or impressions inevitably left by the clamps required when the sheets are thermally treated in vertical position.

In carrying out the invention the sheets in planar form are drawn horizontally and in succession directly from a heating furnace or a tempering furnace. As it emerges from the furnace each sheet first passes over and is supported by rollers, but is gradually transferred from the rollers to a position over a platen from which are emerging upwardly a large number of regularly-spaced jets of gas such as air. The area over which these jets are located is substantially coincident with the area of the sheet so that the latter is temporarily supported on a cushion of gas. The platen is at this time positioned between spaced upper and lower complementary dies and directly beneath and in supporting contact with a hammock of flexible foraminous material yieldably stretched into horizontally planar form.

As soon as the sheet is fully and accurately located over the hammock, and between the dies, the flow of gas from the platen is cut off so that the sheet then rests upon the hammock. The platen is then lowered away from the hammock and translated horizontally to a position free and clear of the dies. The dies are hollow and connected by flexible tubing with a source of coolant under pressure and as soon as the platen is shifted out of the way, the dies are forced together to compress and shape the sheet between them. While under pressure the sheet is cooled and tempered by coolant fluid circulated through the dies.

As soon as the sheet has been properly cooled and tempered the dies are separated and the shaped sheet is supported solely by the hammock, ready for removal. During shaping, the hammock remains interposed between the lower die and the sheet and, being flexible and yieldingly supported, readily conforms to the shape of the completed sheet without leaving scuff marks thereon. However, since the hammock is yieldably stretched or supported, it reassumes its stretched planar form as soon as the dies are separated, and thus supports the shaped sheet ready for removal.

Subsequently the platen is translated back to its original position beneath the hammock and elevated into contact therewith, ready to support the next sheet. Since the hammock is foraminous, as by being woven from glass fibers, reinforced if desired with metallic filaments, it allows jets of gas from the platen to pass upwardly substantially without impediment.

Referring in detail to the drawing, particularly to FIGURE 1, an upper male die 1 is detachably fixed to the lower end of plunger 1a of the piston of a hydraulic press whose cylinder is identified at 3. The lower or female die 2 is fixed in position below die 1 and is complementarily shaped so that when the two are forced into interfitting relation their shaping surfaces are substantially parallel.

Horizontally spaced, parallel tracks 17, 17a are mounted at respective sides of die 2. Track 17 is supported for vertical translation by a pair of piston rods 18a of respective pressure fluid cylinders 18. Likewise track 17a is supported for vertical translation by a pair of piston rods 18b of cylinders 18c. The track may be rigidly interconnected by a frame, not shown, so that they are constrained to move vertically as a unit when fluid under pressure is simultaneously introduced into all of the cylinders 18, 18c, from a source, not shown, under the control of a master controller.

A rigid, hollow, foraminous platen or support 14 is mounted in horizontal position by rollers 16, for translation on and along tracks 17, 17a, from a first position shown in full lines upon FIGURE 3, to a second position indicated in dot-dash lines. In the first position the platen is located between spaced dies 1 and 2. In second position it is free and clear of these dies. There are two rollers 16 on each side.

Platen 14 is a hollow element comprising vertically spaced top and bottom walls connected by relatively narrow side walls. The top wall has a plurality of regularly-spaced holes 15 distributed over its area. A source of gas under pressure, such as air, is connected by piping not shown, to the hollow interior of the platen so that when a valve controlling the admission of such gas is opened, a plurality of jets emerge each through a respective one of holes 15. These jets conjointly act to form a cushion of gas which effectively support a sheet of glass positioned over the platen.

Supports 12, 12a are fixed at either side of lower die 2. Confining attention to support 12, a horizontal shaft 11 is fixed therein and journals one end of a lever 9. A counterweight 10 is carried by an arm 10a fixed to shaft 11, and acts continuously to urge lever 9 into clockwise rotation as viewed for example upon FIGURE 1. The construction just described is duplicated at the other side of the die, so that it is sufficient to identify lever 9a and counterweight 10b urging lever 9a to counterclockwise rotation.

Returning to lever 9 and referring more particularly to FIGURE 3, a T-shaped spreader bar 8 has the extremity of its leg portion swiveled to the distal end of lever 9. The connection is such that the bar may pivot to a limited extent about an axis which in FIGURE 3 is horizontal and lies in the plane thereof. At the other side, bar 8 is duplicated by bar 8a swiveled at 13 a to the distal end of lever 9a.

The parallel arm portions of the two spreader bars are attached to the respective end edges of a hammock 7. This hammock may comprise a loosely woven net of glass fiber which may be reinforced with metallic filament. The principal requirements are that the hammock have sufficient strength to support a sheet of glass thereon and be sufficiently foraminous to allow the free passage therethrough of gas emerging from orifices 15 in the top surface of platen 14. Due to the action of counterweights 10, 10b, the hammock is normally stretched taut as in FIGURES 1, 2 and 6, but readily yields and conforms to the shape of die 1 when the latter is forced downwardly by press 3 into contact with lower die 2. FIGURE 3 shows a portion only of the hammock at the upper left.

A tempering furnace is identified generally at 19, FIGURES 1, 2, 4, 5 and 6, and is provided with an exit opening closable by sliding door 19a and through which sheets of glass 4 are drawn in succession, supported on rollers 20. The initial position of platen 14 is as shown in solid lines upon FIGURES 1 and 3. Comparing these figures it is noted that the platen has a horizontal position directly opposite and aligned with the opening in lehr 19 and through which sheets of glass are successively drawn, and an elevation such that its top surface is a little below the horizontal plane determined by the top of rollers 20. At this time the platen has been raised by the introduction of pressure fluid into cylinders 18, etc., so that it is in convenient position to support the glass sheet by means of the gaseous cushion produced by the jets issuing from orifices 15 of the platen, during its transfer from rollers 20 to the hammock 7.

As shown, upper die 1 is covered with a thin sheet or tissue of glass 5, held in contact with die 1 by a framework 6.

OPERATION

In operation, door 19a is opened and a sheet of glass heated to plasticity is drawn out over rollers 20. At this time gas under pressure is being forced into the interior of platen 14 and is emerging through orifices 15. Thus as the sheet passes over the platen it becomes fully supported by the jets from the platen, passing through hammock 7, so that the sheet is easily and rapidly moved into position fully emplaced over the plate and hammock, and between the dies. Stops or abutments not shown, fixed with the platen determine precisely the correct position of the sheet.

Next the flow of gas under pressure to platen 14 is cut off and pressure fluid is exhausted from the lower ends of cylinders 18, 18c, thus resulting in lowering of the platen away from hammock 7. This step is depicted upon FIGURE 2 wherein the sheet rests upon and is supported by the hammock. The platen is then rolled horizontally along tracks 17, 17a until it assumes the dot-dash position indicated upon FIGURE 3, wherein it is completely out of its former position between the dies. It is contemplated that this movement of the platen along tracks 17, 17a may be effected automatically by power-driven mechanism. For example, a horizontally disposed pressure fluid cylinder and piston, not shown, may have the exterior end of its piston rod attached to platen 14. The cylinder will be double acting and pressure fluid will be introduced to and exhausted from its ends by conduits including a four-way solenoid valve. Thus, by proper time energization and de-energization of the solenoid valve, under the control of a master controller, the platen may be positively translated between the two limiting positions shown upon FIGURE 3.

Immediately upon movement of the platen free and clear of the dies, fluid under pressure is introduced into press cylinder 3. FIGURE 4 shows the resulting position wherein die 1 has moved downwardly almost to its lower limit within die 2. Sheet 4 and hammock 7 have both conformed generally to the shape of the dies. Due to its inherent flexibility and its yielding and swiveling mounting, the hammock in effect wraps around the sheet of glass and thus does not leave scuff marks thereon. As soon as, or a little before the dies come together in final pressing position, namely the postion of FIGURE 5, coolant is introduced into and flows through the hollow dies to thus temper the glass and cause it to set in the desired shaped form.

Thereafter, upper die 1 is retracted by the introduction of pressure fluid into the lower end of cylinder 3 below the piston therein, and exhaustion of fluid from the upper end. FIGURE 6 shows the upper die fully retracted, ready for a new cycle. Counterweights 10, 10a have again restored hammock 7 to stretched horizontal position with the shaped sheet of glass resting thereon and ready for removal. The platen in its lowermost position has been moved along tracks 17, 17a to its former location beneath the hammock and all parts are in readiness for the next cycle which will begin by the elevation of the platen to the position of FIGURE 1.

FIGURE 7 shows a modified form which one or both of the dies may have. A plate 27 curled to the general contour of the sheet of glass after shaping, has a plurality of regularly-spaced holes over its area, each normal to the surface of the plate at that location. A flanged sleeve 26 fits and is fixed within each respective hole, with its central flange 26a flush against the lower surface of the plate. Attachment of each sleeve may be effected by rivets passed through aligned holes in the flange and plate. Each sleeve receives with a smooth sliding fit an outer tube 23 forming a part of an assembly including a hollow parallelepipdal box 21 having a central aperture in its lower wall and which fits over and is integrally secured to the upper end of tube 23. Means not shown, are provided to prevent turning of each tube within its sleeve. A coil spring 29 surrounds the end of the sleeve projecting above plate 27 and acts at one end against the lower wall of the box and at the other end against the plate, to urge each assembly into the upper limiting position shown, with respect to the sleeve. This position is determined by a collar 23a secured to and exteriorly about tube 23 between its ends. Thus each tube and its box may have limited axial translation only, in and with respect to its sleeve. Downward movement is limited by contact of the lower wall of the box with the top end of the sleeve.

An inner tube 25 of smaller external diameter than the interior diameter of tube 23 is secured within and coaxially of tube 23. Connection between the two tubes is effected by a closure sealing the lower end of tube 23. Tube 24 passes through and is sealed within a central aperture in the closure. Inner tube 24 terminates at its upper end within box 21 and its lower end protrudes below tube 23 and is adapted for connection at 25 with a flexible exhaust tube, not shown. At its lower end projecting below sleeve 26, tube 23 is provided with an inlet 23b likewise adapted for connection with a tube, not shown, and through which coolant is supplied to the respective box.

Boxes 21 are closely spaced and the outer surfaces of their upper walls conjointly define a substantially smooth continuous surface which surface conforms to the desired contour of the sheet to be shaped. The upper surface of each box may be cooled by the introduction into outer tube 23 and its exhaustion from inner tube 24, of coolant such as chilled air, as indicated by the arrows, FIGURE 7. As thus indicated the flow is preferably but not necessarily, to each tube 23b, upwardly in tube 23 through the space between tubes 23, 24 into box 21, thence into the open upper end of tube 24 and downwardly therein to exhaust at 25. The coolant may be recirculated after extraction of heat by mechanism not shown.

As the result of the construction shown, various selected ones of the boxes 21 may be retracted from the sheet, after shaping thereof, to correspondingly vary the tempering of the glass over certain areas. Alternatively the rate of flow of coolant to the several boxes may be selectively and individually varied, as by a plurality of valves each controlling the rate of flow of coolant to a corresponding inlet 23b to thus vary the tempering of the glass over selected areas. It will be understood that both upper and lower dies may be constructed as depicted upon FIGURE 7.

I have thus provided a method and apparatus which fulfill and attain all of the objects stated. The apparatus is particularly well adapted to complete automation under control of a master controller which will, in succession, close circuits operating solenoid valves controlling the flow of fluid under pressure to cylinders 18, 18, the flow of gas under pressure to platen 14, the withdrawal of a heated sheet of glass from furnace 19, the withdrawal of pressure fluid from cylinders 18, etc. to lower the platen the automatic horizontal translation of platent 14 from between the dies and its return thereto, the introduction of pressure fluid to press cylinder 3, the introduction of coolant into the dies or into boxes 21 in the case of FIGURE 7, and the cutting off of flow of coolant and separation of the dies. Each step is readily adaptable to automation by means of a master controller effecting closure of circuits in proper sequence and relative time duration.

While I have shown the form of the invention presently preferred, numerous changes of shape and form, alteration, and substitutions of equivalents will readily occur to those skilled in the art, after a study of the foregoing disclosure.

Having fully disclosed the invention, what I claim and desire to secure by Letters Patent is:

1. The method of shaping a sheet of glass, comprising, supporting the sheet on a cushion of gas, between a pair of complementary shaped dies and over a flexible foraminous hammock, removing the cushion support to leave the sheet supported on and by the hammock, and pressing the dies together to shape the sheet therebetween.

2. The method of shaping an essentially flat sheet of bendable material, comprising, yieldably supporting a flexible foraminous hammock between dies, translating a sheet to be shaped over the hammock while supporting the same on a cushion of gas passing upwardly through the interstices of the hammock, removing the cushion of gas to effect lowering of the sheet onto the hammock, and forcing the dies together to shape the sheet while supported on and by the hammock.

3. That method of shaping into curved form an originally flat sheet of glass, comprising, yieldably supporting a hammock of flexible foraminous material horizontally between upper and lower dies, horizontally moving a sheet of glass heated to plasticity, to and between the dies and over the hammock while supporting the sheet upon a cushion of gas, removing the gas cushion to effect lowering of the sheet onto the hammock for support thereby, forcing the dies together to shape the sheet between them, and cooling and tempering the shaped sheet while compressed between the dies by passing coolant into at least one of the dies.

4. The method of claim 3, said tempering and cooling of the sheet being effected by variably cooling the same over predetermined areas thereof.

5. An apparatus for the production of sheets of glass curved in at least one plane, comprising, a pair of dies having complementary shaping surfaces and movable from a first vertically-spaced position to a second interfitting position, means operable to move said dies between said positions, a hammock of flexible foraminous material, means yieldingly stretching said hammock horizontally between said dies, a hollow platen having a flat foraminous upper surface forming a cushion of air supporting thereover a sheet to be shaped, and means mounting said platen with said upper surface horizontal and for horizontal translation between a first position beneath said hammock and between said dies, and a second position free and clear of said hammock and said dies.

6. The apparatus of claim 5, said last-included means comprising a pair of horizontal, horizontally-spaced parallel tracks, and fluid pressure operated means selectively operable to vertically raise and lower said tracks as a unit, from a raised position wherein said platen contacts said hammock, to a lowered position free and clear of said hammock.

7. The apparatus of claim 5, at least one said die being formed as a plurality of separate and adjacent hollow boxes yieldably mounted upon a support, and means operable to selectively supply coolant to each said box.

8. The apparatus of claim 7, at least some of said boxes being retractable out of contact with a sheet normally engaged and shaped thereby.

References Cited

UNITED STATES PATENTS

| 3,223,501 | 12/1965 | Fredley et al. | 65—25 |
| 3,258,324 | 6/1966 | Torok | 65—356 |
| 3,265,484 | 8/1966 | Ritter | 65—104 |

S. LEON BASHORE, Primary Examiner

ARTHUR D. KELLOGG, Assistant Examiner

U.S. Cl. X.R.

65—104, 106, 273, 275, 289, 356